Patented Sept. 2, 1952

2,609,322

UNITED STATES PATENT OFFICE 2,609,322

PRODUCTION OF PENICILLIN MOLD AND JELLY

Agnes J. Quirk, Washington, D. C.

No Drawing. Application September 6, 1951,
Serial No. 245,415

10 Claims. (Cl. 167—58)

(Granted under the act of March 3, 1883, as amended April 30, 1928; 370 O. G. 757)

The invention herein described may be manufactured and used by or for the Government of the United States of America for governmental purposes throughout the world without the payment to me of any royalty thereon.

This application is a continuation-in-part of the application filed February 10, 1950 and bearing Serial No. 143,610.

This invention relates to the production of an activated penicillin-producing mold and to a process of culturing this mold to produce an aqueous mixture containing dissolved penicillin. It further relates to the production of a penicillin jelly for use in topical therapy, particularly a jelly produced by the emulsification of the aforesaid aqueous mixture containing penicillin and a solidifying agent.

In general, the invention involves culturing P. notatum in a sterile culture medium containing oxidized potato juice to produce an activated mold. Thereafter, the activated mold is cultured in a conventional manner to produce an aqueous mixture containing dissolved penicillin and the mixture is emulsified with a solidifying agent to form a jelly.

According to the invention, P. notatum, preferably a certified strain thereof although any strain is operative, is cultured in a culture medium containing oxidized potato juice to produce an activated mold. Except for the oxidized potato juice, the remainder of the medium is conventional for culturing penicillin-producing molds and contains, for example, an assimilable carbon source, such as a sugar like dextrose. A solidifying agent, such as agar, is also included to solidify the medium when it is to be used as a surface culture medium. The medium is sterilized, prior to its use, in accordance with conventional practice.

The production of the activated mold will now be described in greater detail, utilizing a solid, sterile culture medium, that is, a surface culture medium as indicated above, to cuture P. notatum.

This solid, sterile culture medium is prepared as follows:

*Preparation of oxidized potato juice.*—Raw potatoes are thoroughly scrubbed, pared, weighed, and ground. To each part, by weight, of the ground potato is added two parts, by weight, of distilled water, and the resulting mixture is exposed to air, preferably by being allowed to stand in an open container in a refrigerator for several hours. The resulting mixture, which contains oxidized potato juice, starch dispersed therein, and an insoluble residue which is chiefly cellulose, is stirred well to distribute the starch throughout. The stirred mixture is then filtered through cheesecloth to permit the oxidized potato juice and the starch to pass through, and the filtrate is collected in flasks. The flasks are autoclaved for one hour at 115° C. and allowed to stand overnight, whereupon the cooked starch precipitates. The oxidized juice is separated from the precipitated starch by decantation and filtered through cotton. No water should be added to the resulting filtrate of oxidized juice to make up to volume.

To the oxidized juice is added 2% of dextrose as the sugar, and 4% of agar as the solidifying agent. The resulting mixture is cooked for one hour and filtered through cotton. The filtrate is collected in small flasks and autoclaved for 20 minutes at 115° C. Upon cooling, the solid, sterile culture medium is obtained.

P. notatum is thereafter cultured on this solid, sterile culture medium, preferably for about from 10 to 14 days, to produce the activated mold which is readily removed from the surface of the medium.

The activated mold is then cultured on a conventional culture medium as for example unoxidized potato juice, to produce penicillin in aqueous mixture which may subsequently be emulsified into a jelly by adding a solidifying agent, particularly agar, and mechanically emulsifying the mixture. These procedures are exhibited in greater detail as follows:

At the end of the first culture period, the resulting activated mold is transferred to the second sterile culture medium containing the unoxidized potato juice, and is permitted to grow on this medium to produce penicillin, preferably for a period of about from 10 to 14 days. As a result, the penicillin, which is produced as the mold exudate, is dissolved in the supernatant water of the medium, this water being covered with mold growth.

This second medium is prepared as follows: Raw potatoes are thoroughly scrubbed, pared, and cut into cylinders or small pieces. The cut potato is immediately placed in an Erlenmeyer flask, and water is added thereto in the proportion of 3 parts, by weight, of water to each part, by weight, of potato. The flask is plugged with cotton and autoclaved for 20 minutes at 115° C. The effect of this treatment is to substantially prevent oxidation of the potato.

At the end of this second culture period, the resulting yellow liquid (penicillin in solution) along with the covering mold is poured on a third solid, sterile culture medium containing unoxidized potato juice, a sugar, preferably dextrose, and a solidifying agent, preferably agar, and allowed to grow to concentrate the penicillin, preferably for at least 14 days.

This third medium is prepared as follows: To prepare the unoxidized potato juice, raw potato is sliced into thin pieces which are immediately covered with distilled water to prevent oxidation of the potato, the resulting mixture containing water and potato in the proportion of 2 parts, by weight, of water to each part, by weight, of potato. The mixture is steamed for 20 minutes or permitted to simmer in a water bath at a temperature below 60° C. for one hour, after which it is filtered through cheesecloth and the unoxidized potato juice filtrate made up to the original amount with water.

To the unoxidized potato juice filtrate, there is added 2% of dextrose as the sugar, and 4% agar as the solidifying agent, and the resulting mixture cooked for one hour and filtered through cotton. The resulting filtrate is then autoclaved for 20 minutes at 115° C. and upon cooling, the solid, sterile culture medium is obtained.

After the third culture period, the arising mold may be removed, and the remaining part of the culture, which contains an aqueous solution of penicillin in agar, is mechanically emulsified, as by being forced through a sieve, to a jelly.

The product has good keeping qualities, probably due to the agar base, and is well-maintained at refrigeration temperature. The penicillin unitage of the product is from 30 to 50 Oxford units per gram.

The product of the invention appears to be a slow release vehicle, an advantage similar to the concentration of penicillin in beeswax and peanut oil. Attestation to its stability on hospital shelves for periods exceeding 8 months has been made. Chemical tests have shown that it is non-toxic.

Having thus described my invention, I claim:

1. A process comprising culturing *P. notatum* on a sterile culture medium containing oxidized potato juice to produce an activated mold.

2. A process comprising culturing *P. notatum* on a solid, sterile culture medium containing oxidized potato juice and dextrose to produce an activated mold.

3. A process comprising culturing *P. notatum* on a solid, sterile culture medium containing oxidized potato juice, dextrose, and agar to produce an activated mold.

4. A process comprising culturing *P. notatum* on a sterile culture medium containing oxidized potato juice to produce an activated mold and culturing the activated mold on a second sterile culture medium to produce penicillin.

5. A process comprising culturing *P. notatum* on a solid, sterile culture medium containing oxidized potato juice and dextrose to produce an activated mold and culturing the activated mold on a second sterile culture medium containing unoxidized potato juice to produce an aqueous mixture containing mold and dissolved penicillin.

6. A process comprising culturing *P. notatum* on a solid, sterile culture medium containing oxidized potato juice and dextrose to produce an activated mold and culturing the activated mold on a solid, sterile culture medium containing unoxidized potato juice and dextrose and allowing the mold to grow there in to produce penicillin.

7. A process comprising culturing *P. notatum* on a solid, sterile culture medium containing oxidized potato juice and dextrose to produce an activated mold, culturing the activated mold on a second sterile culture medium containing unoxidized potato juice to produce an aqueous mixture containing mold and dissolved penicillin, transferring the aqueous mixture to a third solid, sterile culture medium containing unoxidized potato juice and dextrose and allowing the mold to grow thereon to produce penicillin.

8. A process comprising culturing *P. notatum* on a solid, sterile curture medium containing oxidized potato juice and dextrose to produce an activated mold, culturing the activated mold on a second sterile culture medium containing unoxidized potato juice to produce an aqueous mixture containing mold and dissolved penicillin, transferring the aqueous mixture to a third solid, sterile culture medium containing unoxidized potato juice and dextrose and allowing the mold to grow thereon to produce pencillin, removing the arising mold, and mechanically emulsifying the remainder of the culture medium to a jelly.

9. A process comprising culturing *P. notatum* on a solid, sterile culture medium containing oxidized potato juice, dextrose, and agar to produce an activated mold, culturing the activated mold on a second sterile culture medium containing unoxidized potato juice to produce an aqueous mixture containing mold and dissolved penicillin, transferring the aqueous mixture to a third solid, sterile culture medium containing unoxidized potato juice, dextrose, and agar and allowing the mold to grow thereon to produce penicillin, removing the arising mold, and mechanically emulsifying the remainder of the culture medium to a jelly.

10. A process comprising culturing a penicillin-producing mold on a sterile culture medium to produce penicillin, said mold having been produced by culturing *P. notatum* on a sterile culture medium containing oxidized potato juice.

AGNES J. QUIRK.

REFERENCES CITED

The following references are of record in the file of this patent:

UNITED STATES PATENTS

| Number | Name | Date |
|--------|------|------|
| 2,437,766 | Stevenson | Mar. 6, 1948 |
| 2,458,495 | Foster | Jan. 11, 1949 |

OTHER REFERENCES

Hazeltine: "The Washington Post," October 3, 1951, page 14, article relating to "Athlete's Foot . . . ."